Feb. 8, 1927.
J. T. JANETTE
1,616,577
STRAINER
Filed March 30, 1925
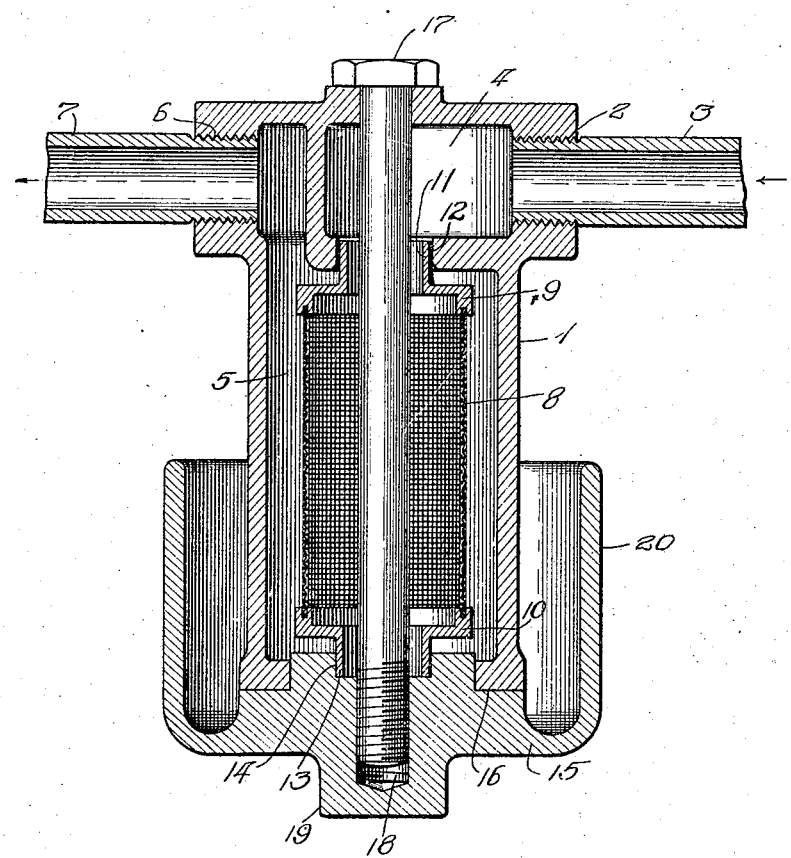
Inventor:
John T. Janette,
By Glenn S. Noble
Atty.

Patented Feb. 8, 1927.

1,616,577

UNITED STATES PATENT OFFICE.

JOHN T. JANETTE, OF CHICAGO, ILLINOIS.

STRAINER.

Application filed March 30, 1925. Serial No. 19,402.

This invention relates to strainers particularly intended for straining fuel oil for oil burning furnaces, although it may of course be used wherever applicable. Strainers of this character adapted for straining fuel oil have heretofore been frequently constructed so that the strainer or straining element may be removed from the top of the enclosing chamber in order to reduce the fire hazard. In other words, if the strainer is removed from the bottom of the chamber, the oil contained in the chamber would be apt to run out on the floor. However, the removal of the strainer element from the top of the chamber is objectionable as more or less sediment is apt to be left in the oil in the chamber and such sediment will be stirred up so that it is apt to pass on to the burner and cause obstruction in the burner jet.

In accordance with my improved device, I provide means whereby the strainer element may be removed from the bottom of the chamber and any oil contained in the chamber will be caught in a receptacle intended for this purpose and forming a part of the device.

The objects of this invention are to provide an improved strainer adapted to reduce the fire hazards of an oil burning system; to provide a strainer of this character in which the strainer and oil may be removed from the bottom of the strainer chamber without spilling the oil or permitting it to run on the floor; to provide a strainer which may be easily manufactured and readily assembled; and to provide such other desirable features as may appear from the following description.

The figure shown in the accompanying drawing is a vertical sectional view of my improved strainer.

In the particular form of the invention as shown in this drawing, the strainer body or casing 1 is provided with a threaded intake opening 2 for receiving the intake pipe 3. The intake leads to a chamber 4 at the top of the casing, which is separated by a suitable wall from the main chamber 5. The main chamber is provided with a threaded outlet 6 for the outlet pipe 7. The strainer 8 may be made of any suitable material, such as woven wire, perforated metal, or other material used for such purposes. The strainer is preferably made of cylindrical form and is provided with upper and lower heads 9 and 10, which for convenience are identical in construction. The upper head 9 has a tubular projection 11, which fits in a hole 12 in the bottom wall of the chamber 4. The tubular projection 13 of the lower head 10 fits in a recess 14 in the combined plug and receptacle 15. The plug member 15 fits closely in the lower end of the casing 1 and securely closes the chamber by means of a joint 16 which is preferably ground, in order to avoid the necessity of a washer or gasket. The plug or bottom member 15 is held in position by a bolt or cap screw 17, which projects downwardly through the top of the casing and through the tubular projections of the heads 9 and 10 and is threaded at its lower end to engage with the correspondingly tapped hole 18 in the bottom member. The bottom member also has a projection 19 for engagement by a wrench in order to hold it when the bolt is tightened. The plug or bottom closing member 15 extends outwardly beyond the sides of the casing 1 and has an upwardly extending flange or wall 20, thereby forming a cup or receptacle which is sufficiently large to hold all of the oil or liquid in the casing and adjacent portion of the intake pipe.

The oil or liquid to be strained passes in through the intake pipe 3 to the chamber 4, then down through the tubular extension 11 and then out through the walls of the screen 8 into the chamber 5 and from thence through the outlet pipe 7. When it becomes necessary to clean the strainer, the bolt 17 is removed, which will permit the combined plug and receptacle 15 to be disengaged from the casing or body 1 and the screen may be removed therewith. It is understood that if necessary, means such as a valve will be provided for shutting off the oil from the intake pipe. By removing the screen and oil through the bottom of the casing, all of the sediment in the screen or in the bottom of the casing will be removed and after the parts are cleaned, the screen may be again inserted and the parts assembled as above described. The combined plug and receptacle furnishes convenient means for catching the oil so that it will not be apt to be spilled on the floor. While, for convenience in description, I have designated the pipe 3 as an "intake" pipe and the pipe 7 as an "outlet" pipe, it will of course be apparent that the flow may be reversed through the strainer in which case the operation will be substantially the same with the exception that the particles which are screened out will be on the outside of the strainer instead of on the inside.

Having thus described my invention, which however I do not wish to limit to the exact details of construction herein shown and described except as specified in the following claims, what I claim and desire to secure by Letters Patent is:

1. A strainer having a body portion, and having a readily removable combined bottom closure and receptacle, the receptacle being of a capacity sufficient to retain the entire contents of the strainer body.

2. A strainer comprising a body portion, a strainer element mounted in the body portion, means for directing liquid through said element and out from the body portion, and a readily removable combined bottom closure and receptacle for said body portion, said receptacle having a capacity sufficient to retain the entire contents of the strainer.

3. A strainer of the character set forth, having a relatively fixed upper portion and a readily removable closure portion, and a receptacle fixed with the closure portion and having sufficient capacity to hold the entire contents of the strainer, substantially as described.

JOHN T. JANETTE.